United States Patent
Deskevich et al.

(10) Patent No.: US 8,663,514 B2
(45) Date of Patent: Mar. 4, 2014

(54) GAS-ASSISTED CO-INJECTION MOLDED CHAIR

(75) Inventors: Adam Daniel Deskevich, Pennsburg, PA (US); Hendrik Richard Van Hekken, Allentown, PA (US); Richard A. Wolfe, Hickory, NC (US)

(73) Assignee: Knoll, Inc., East Greenville, PA (US)

( * ) Notice: Subject to any disclaimer, the term of this patent is extended or adjusted under 35 U.S.C. 154(b) by 126 days.

(21) Appl. No.: 13/104,227

(22) Filed: May 10, 2011

(65) Prior Publication Data

US 2011/0278903 A1 Nov. 17, 2011

Related U.S. Application Data

(60) Provisional application No. 61/333,348, filed on May 11, 2010.

(51) Int. Cl.
*B29C 44/06* (2006.01)
*B29C 45/16* (2006.01)

(52) U.S. Cl.
USPC ....... 264/46.5; 264/255; 264/328.8; 264/572; 297/451.11

(58) Field of Classification Search
None
See application file for complete search history.

(56) References Cited

U.S. PATENT DOCUMENTS

| | | | |
|---|---|---|---|
| 3,669,496 A | 6/1972 | Chisholm | |
| 3,751,109 A | 8/1973 | Dufton | |
| 4,033,710 A * | 7/1977 | Hanning | 425/543 |
| 5,770,237 A * | 6/1998 | Sayer et al. | 425/130 |
| 5,985,188 A | 11/1999 | Jennings et al. | |
| 6,423,254 B1 * | 7/2002 | Bertoglio | 264/45.3 |
| 7,600,820 B2 | 10/2009 | Bouche et al. | |
| 2002/0079603 A1 * | 6/2002 | Bemis et al. | 264/40.7 |
| 2008/0277839 A1 * | 11/2008 | Smith | 264/513 |

* cited by examiner

*Primary Examiner* — Matthew Daniels
*Assistant Examiner* — David Schmerfeld
(74) *Attorney, Agent, or Firm* — McNees Wallace & Nurick LLC

(57) ABSTRACT

The invention is directed to an article made from co-injection molding using gas-assist. The article has an inner material and an outer material. The inner material has a blowing agent uniformly distributed throughout the inner material. The outer material surrounds the inner material. The use of the blowing agent in the inner material produces a repeatable and consistent structure, as the blowing agent is uniformly activated through the product. The use of the gas-assist the heat and pressure associated with the blowing agent is allowed to out gas, thereby insuring that the finished molded chair or other item is aesthetically pleasing while providing increased strength and reduced weight compared to traditional plastic chairs formed with known methods.

18 Claims, 6 Drawing Sheets

GAS-ASSISTED CO-INJECTION MOLDED CHAIR

RELATED APPLICATION DATA

This application claims the benefit of U.S. Provisional Application Ser. No. 61/333,348, which was filed on May 11, 2010, herein incorporated by reference.

FIELD OF THE INVENTION

The present invention is directed to a chair which is manufactured from a co-injection molding process, and more particularly to a chair which is suitable for use in professional environments such as an office.

BACKGROUND OF THE INVENTION

Molded chair shells have been well known in the art for some time. A typical example of a molded chair shell is disclosed in U.S. Pat. No. 3,669,496, which includes a single, molded piece that forms the seat and the seat back. The chair further requires a frame, i.e., a back support, to which the molded piece is attached. Another example of a molded chair is disclosed in U.S. Pat. No. 3,751,109, which shows a single, molded piece with legs attached at the bottom. This chair does not have a back support and therefore may be prone to material failure.

U.S. Pat. No. 5,985,188 discloses a method and mold design for forming a molded chair seat portion and chair back support portion using air counter pressure and two different materials in an injection molding procedure. The two different materials comprise a first material having a low flexural modulus and the other material having a high flexural modulus. Other additives for tailoring the physical properties of the molded product are added to the mixture of the two materials. The air counter pressure is achieved using shop air pressure. The mold may be used to form the seat portion and the back support portion with a single stroke. An endothermic foaming or blowing agent is added to the mixture of the two materials to reduce the weight of the finished part, to reduce cycle time, and to assist in the uniform distribution of the materials that are injected into the mold cavity by the injection nozzle.

U.S. Pat. No. 7,600,820 discloses a molded chair shell which includes a seat portion and a back portion joined at a junction area. A support or reinforcement member is located at the junction area and is formed integrally with the seat portion and the back portion. The reinforcement member includes an internal cavity between the seat portion and the back portion that is substantially positioned over the junction area. The cavity is formed by cavity walls, which may form ribs that extend forwardly along the seat portion and upwardly along the back portion of the chair shell. The chair shell may be formed in an injection molding process, and the internal cavity may be formed in a gas assist operation carried out during the injection molding process.

While these molded chairs have been useful, there is a need for a molded chair which is aesthetically pleasing and which provides for increased strength and reduced weight compared to traditional plastic chairs formed with known methods.

SUMMARY OF THE INVENTION

In an exemplary embodiment, the introduction of pressurized gas into the inner material displaces the inner material to form a hollow channel inside the inner material, thereby helping to pressurize the internal material. In another exemplary embodiment, the introduction of the gas nozzle into the inner material provides a pathway which allows out gas generated by the expanding of the blowing agent to be vented through the gas nozzle through the outer material, such that the effects of post blow in the inner material are minimized and the swelling of the chair is minimized. In another exemplary embodiment, the retraction of the gas nozzle from the outer material creates an opening in the outer material which provides a pathway which allows the out gas generated by the blowing agent to escape as the inner material cools.

An exemplary method of making a chair includes: co-injection molding a first portion of an outer material in a mold cavity; co-injection molding an inner material in a mold cavity, the inner material including a blowing agent uniformly distributed therein, the inner material cooperating with the outer material; co-injection molding a second portion of the outer material to encapsulate the inner material in a mold cavity; injecting pressurized gas into the inner material in the mold cavity; and removing the completed chair from the mold cavity. The introduction of the pressurized gas into the inner material displaces a portion of the inner material to help pressurize the internal material.

Another exemplary method of making a chair includes: co-injection molding a first portion of an outer material in a mold cavity; co-injection molding an inner material in a mold cavity, the inner material having a blowing agent uniformly distributed therein, the inner material cooperating with the outer material; co-injection molding a second portion of the outer material to encapsulate the inner material in a mold cavity; forming a pathway through the outer material and into the inner material; and removing the completed chair from the mold cavity. The pathway allows out gas generated by the expanding of the blowing agent of the inner material to be vented through the outer material, whereby the effects of post blow in the inner material are minimized and whereby swelling of the chair is minimized.

An exemplary chair made from co-injection molding includes an inner material and an outer material. The inner material is a thermoplastic inner material having a blowing agent uniformly mixed therein and distributed throughout the inner material. The outer material is a thermoplastic outer material surrounding the inner material. The outer material has no blowing agent mixed therein and has a smooth finish. At least one opening is provided in the outer material. The opening extends through the outer material to the inner material providing a pathway which allows out gas generated by the blowing agent in the inner material to escape as through the outer material. The outer material provides an aesthetically pleasing outer surface and the inner material provides a strong core which is free of large voids, the inner and outer materials combining to form an article with a stable profile and repeatable size.

The use of pressurized gas co-injection in molding large objects, such as a chair, provides several advantages over, and addresses many of the problems caused by, molding thick pieces of plastic using known methods. The advantages include, but are not limited to, allowing for improved packing of the chair while minimizing the swelling that occurs because the blowing agent is still reacting and the inner and outer materials are still hot enough to be pliable. Without the use of gas assist, the blowing agent is completely encapsulated by the outer material of the chair, such that the blowing agent has no place to escape or out gas. With the gas assist and the associated pathways, the inner material is allowed to cool more quickly and the heat and pressure associated with the blowing agent is allowed to out gas, thereby insuring that the finished molded chair or other item is aesthetically pleasing while providing increased strength and reduced weight compared to traditional plastic chairs formed with known methods.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 2:
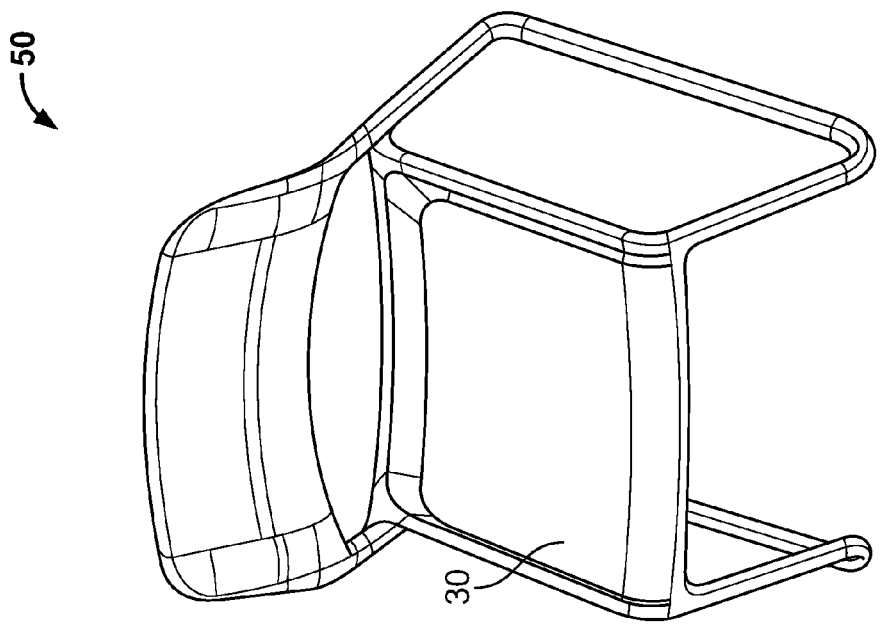
FIG. 2 is a perspective view of a second embodiment of a co-injection molded chair of the invention.
Figure 1:
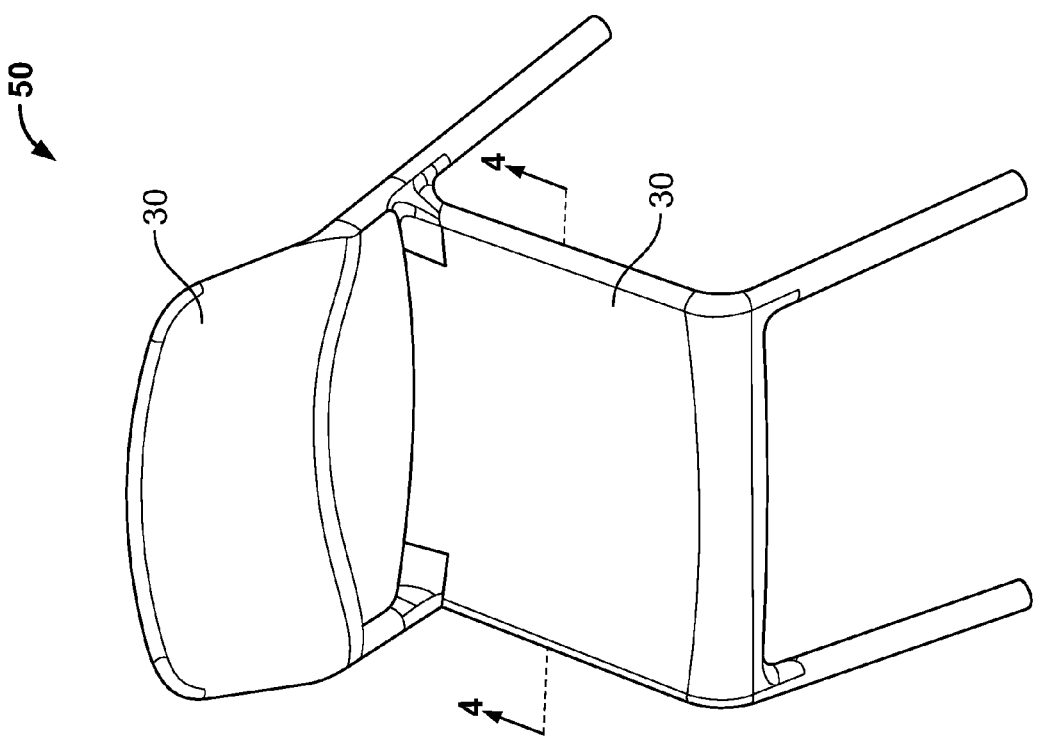
FIG. 1 is a perspective view of a first embodiment of a co-injection molded chair of the invention.
Figure 3:
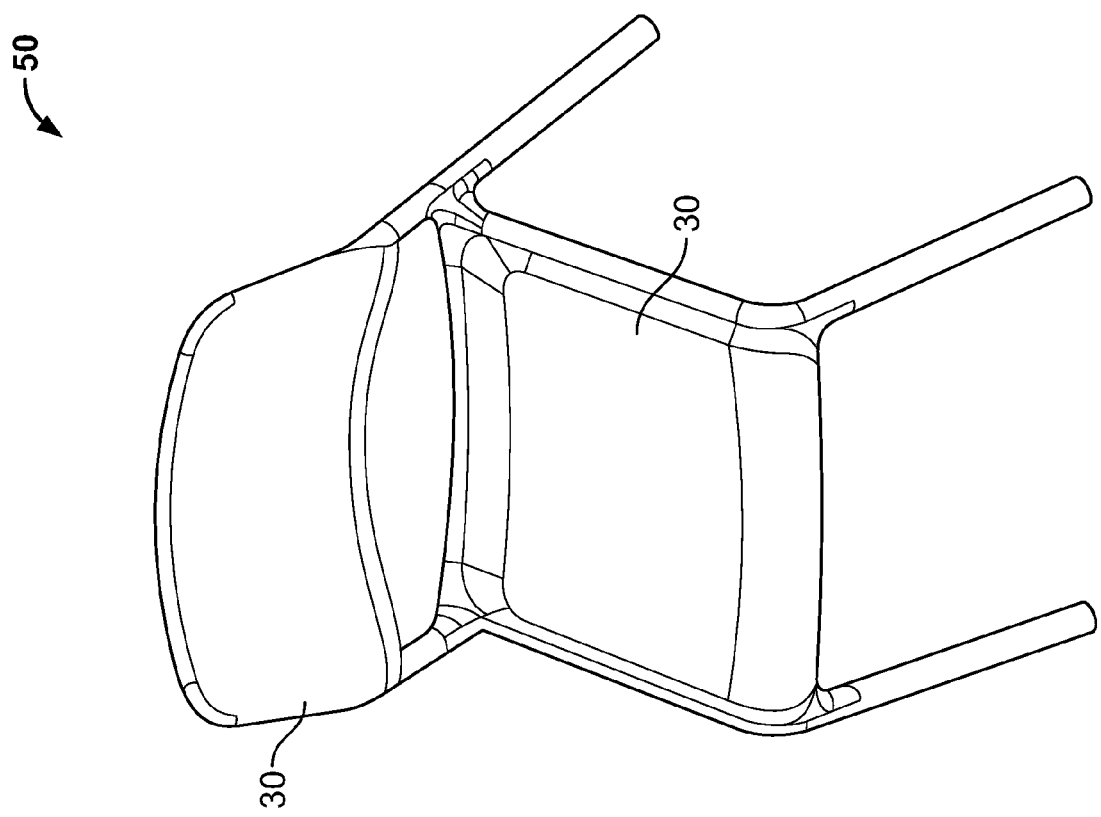
FIG. 3 is a perspective view of a third embodiment of a co-injection molded chair of the invention.

Chairs 50 made by the co-injection molding process herein described are shown in FIGS. 1 through 4. As used herein, the term co-injection molding is meant to refer to a process by which two like or dissimilar plastics (e.g., a skin or outer material 30 and a core or inner material 40) originating from different sources (e.g., injection units 12, 14) are injected into a single mold 16 during a single cycle. The co-injection of the plastics may be sequential or simultaneous, as further described below. Co-injection molding is different from insert molding or overmolding.

Co-injecting the plastics may be done using a substantially sequential process. Typically, plastics are injected through a co-injection manifold and into the mold at temperatures around 300-600 degrees Fahrenheit. A co-injection manifold 10 (FIGS. 5 and 6) is typically located between injection units or barrels 12, 14 and a mold 16. A typical co-injection manifold 10 is fixed to the injection units 12, 14. Suitable co-injection manifolds 10 and other co-injection apparatuses which can be used to carry out the methods described herein are known in the industry and will not be described in detail. A wide variety of co-injection apparatuses and co-injection manifolds 10 can be used in conjunction with the invention; the invention is not limited to any particular co-injection apparatus or co-injection manifold 10.

Figure 5:
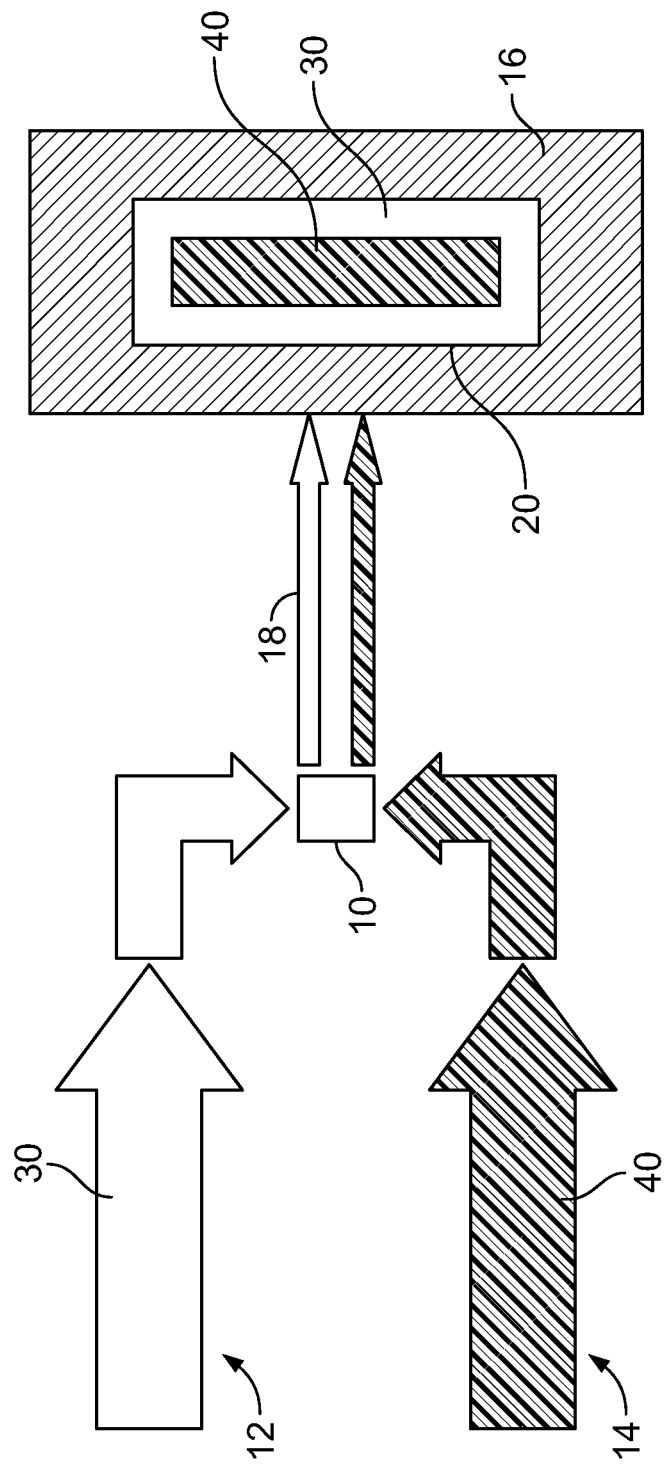
FIG. 5 is a diagrammatic view of the co-injection molding process used to manufacture an article according to the present invention.
Figure 6:
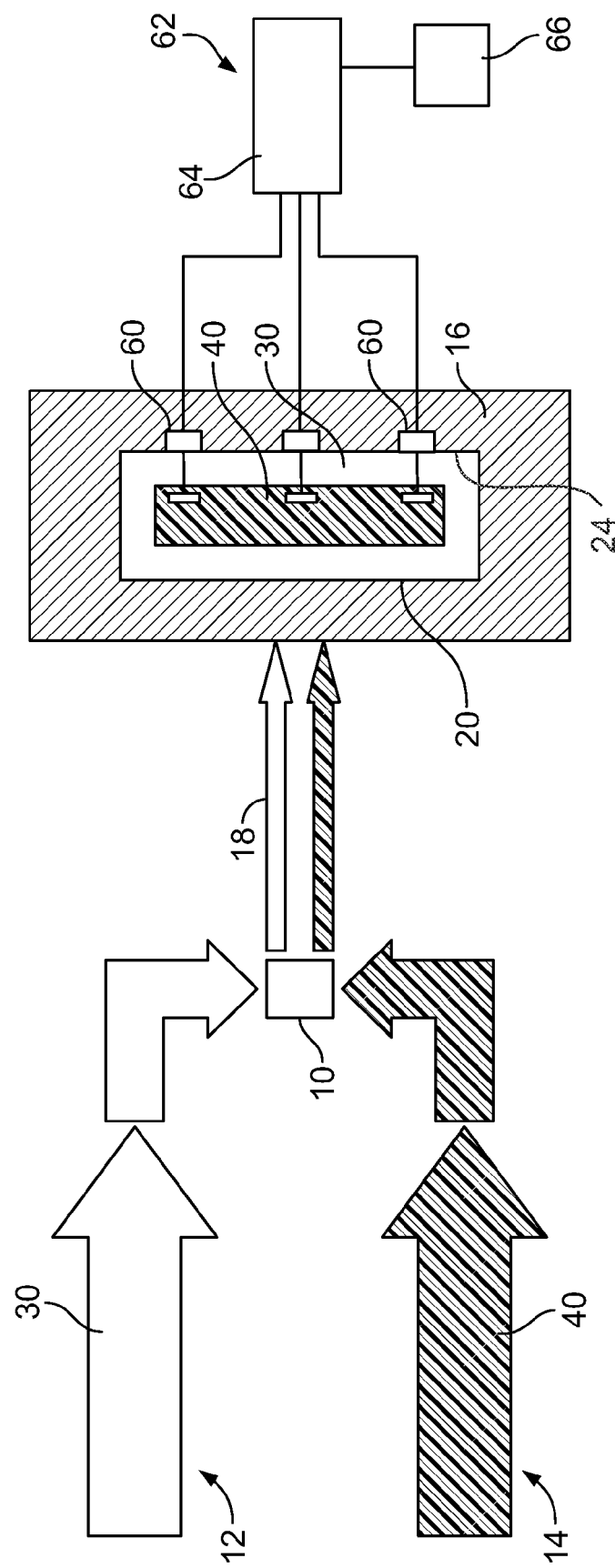
FIG. 6 is a schematic view of a plastic co-injection molding apparatus of the invention wherein plastic resin has partially filled the mold cavity and where a gas nozzle is located in the mold cavity.

An outer material 30 is injected from a first injection unit 12 through a nozzle 18 (as shown in FIGS. 5 and 6) or through a manifold 10 and into a mold cavity 20 of the mold 16. The outer material 30 may be, but is not limited to, a synthetic thermoplastic resin, including, but not limited to, glass-filled polypropylene copolymer. The flow of the outer material 30 into the mold cavity 20 is stopped when the desired amount of outer material 30 is positioned in the mold cavity 20. The flow of the inner material 40 is then injected from a second injector unit 14 through the nozzle 18 into the mold cavity 20 of the mold 16. This allows the inner material 40 to be injected inside the outer material 30. The inner material 40 may be, but is not limited to, a thermoplastic resin including, but not limited to, glass-filled polypropylene copolymer. The inner material 40 may comprise the same materials found in the outer material 30. The inner material 40 may also comprise recycled, or ground-up, outer material 30 or inner material 40 that is not useable because it is discolored or otherwise does not meet product specifications. The inner material 40 may also include recycled inner material which includes the blowing agents. The inner material 40 has a viscosity that is comparable to that of the outer material 30.

The flow of the inner material 40 into the mold cavity 20 is stopped when the desired amount of inner material 40 is positioned in the mold cavity 20. The flow of the outer material 30 is then again injected from the first injector unit 12 through the nozzle 18 into the mold cavity 20, filling the remainder of the mold cavity 20. This seals off the inner material 40, allowing the inner material 40 to be encapsulated inside the outer material 30.

Figure 4:
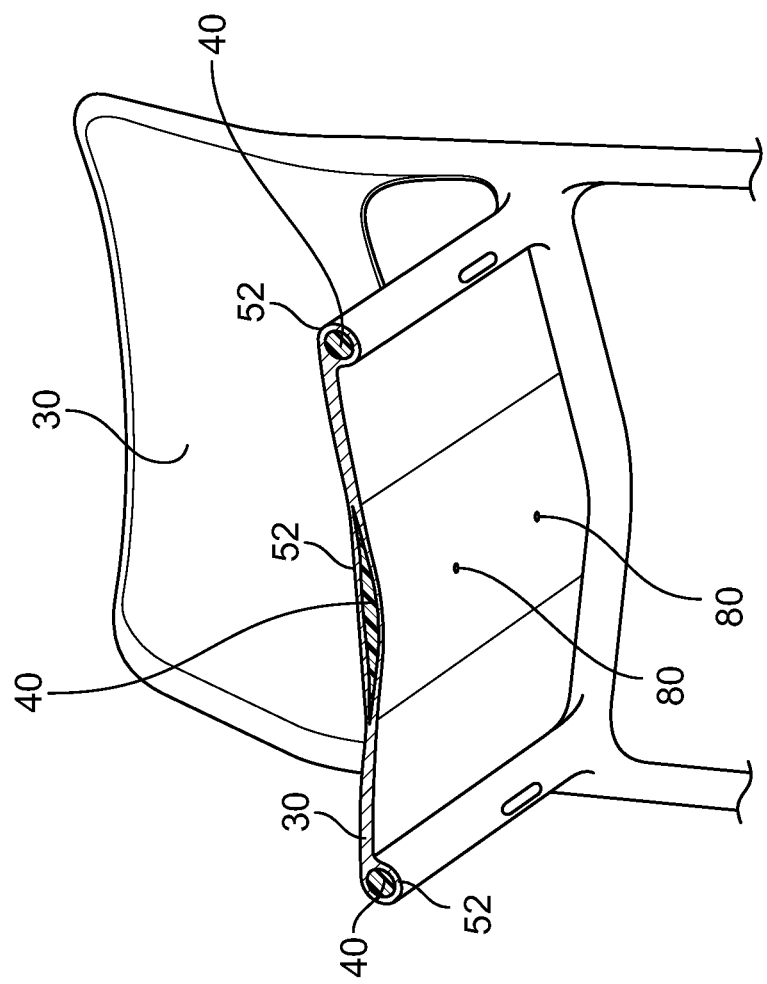
FIG. 4 is a perspective cross-sectional view taken along line 4-4 of FIG. 1.

When using sequential co-injection, the outer material 30 is first injected into the mold 16 to fill approximately 60-70 percent of the mold cavity 20. The inner material 40 is next injected into the mold 16 to fill approximately 10-20 percent of the mold cavity 20. Subsequently, additional outer material 30 is finally injected into the mold 16 to fill approximately 10-30 percent of the mold cavity 20. However, other percentages of outer material 30 and inner material 40 may be injected into the mold cavity 20 during the different steps without departing from the scope of the invention. A cross-section of a chair 50 made according to the above is shown in FIG. 4.

Alternatively, simultaneous co-injection may be used. In this process the outer material 30 from a first source is injected into the mold cavity 20. After the start of the injection of the outer material 30, the inner material 40 is injected into the mold cavity 20, such that, for a period of time, the inner material 40 and the outer material 30 simultaneously enter the mold cavity 20. The flow of the outer material 30 is terminated while allowing the inner material 40 to continue to flow. The flow of the inner material 40 is then terminated. The outer material 30 is again injected in order to complete the production of the chair 50 or other object. The flow of the outer material 30 is terminated when the mold cavity 20 is full.

Blowing agents may be added to the inner material 40. However, to preserve the aesthetics and functionality of the chair 50, no blowing agent is added to the outer material 30. Blowing agents are any substance which, alone or in combination with other substances, is capable of producing a cellular structure in a plastic. The blowing agents may include, but are not limited to, soluble solids that leave pores in liquids which develop cells when they change to gases, and chemical agents that decompose or react under the influence of heat to form a gas.

An endothermic blowing agent is a blowing agent that absorbs heat. The endothermic blowing agent is added to the inner material 40 before the inner material 40 is injected into the mold cavity 20. A number of known endothermic blowing agents (whether solid or liquid, physical or chemical) are suitable for use in the methods described herein. Any blowing agent having endothermic properties is suitable and the scope of the invention is not limited to any particular blowing agent.

The endothermic blowing agents are added to the inner material 40, preferably before the inner material 40 is injected into the mold 16, and more preferably before the inner material 40 is injected into the manifold 10. Typically, blowing agents are added in amounts equal to about 0.1 to about 1.00 percent by volume of the inner material 40.

In order to trigger the reaction of the blowing agent, whereby the endothermic blowing agent and the inner material 40 begin to expand, external heat must be provided. The heat can be provided in a variety of ways known in the industry. Additionally, the endothermic blowing agent can absorb heat from the outer material 30 after the outer material 30 and inner material 40 mixed with the blowing agent have been injected into the mold cavity 20. The outer material 30, which is wrapped about the inner material 40 mixed with the blowing agent in the mold cavity 20, provides uniform heat exposure to the inner material 40 mixed with the blowing agent. The outer material 30 remains at a relatively uniform temperature across its cross-sections because of its inherent insulating properties. Accordingly, the outer material 30 of the molded chair or product exhibits a relatively constant temperature for a defined period of time for interaction with the inner material 40 mixed with the blowing agent, which provides the heat-activated endothermic blowing agent within the inner material 40 with a controlled exposure to temperature. One of the benefits of uniform temperature exposure is uniform blowing throughout the part. Also, a reduction in the ratio of blowing agent to inner material 40 can be achieved because there is no need to overload the blowing agent in an effort to compensate for non-uniform temperature or cold pocket areas.

Using an endothermic blowing agent in co-injection methods provides several advantages over, and addresses many of the problems caused by, molding thick pieces of plastic using known methods. Without the use of a blowing agent, large voids and shrinkage would occur in areas of thick cross-section, which would adversely impact the aesthetics and functionality of the chair. As the plastic cools, the blowing agent expands, negating the plastic's tendency to shrink and form voids. This reduces or eliminates the sink marks and other poor aesthetics associated with thick cross sections and reduces undesirable stresses associated with the uneven distribution of material in the chair. This produces chairs and other parts which have consistent and repeatable sizes and profiles.

When applying a blowing agent to the plastic material, the blowing agent tends to migrate to the surface of the plastic, causing swirling and a porous surface. By applying the blowing agent only to the inner material 40, the surface of the inner material 40 is completely encapsulated by the outer material 30. Consequently, since the surface of the inner material 40 is completely encapsulated and not visible to the consumer, the poor surface finish of the inner material 40 is not of concern. In contrast, the outer material 30, with no blowing agent mixed in, has no swirling and does not have a porous surface. The smooth finish of the outer material 30 is displayed to provide the pleasing and consistent aesthetic desired.

The use of the blowing agent also allows for more uniform cells to form, with a better structure. This provides the inner or core material, and the entire structure of the chair, with an increased strength and reduced weight compared to traditional plastic chairs formed with known methods, such as molding a chair from material with no blowing agents and injecting gas (gas-assist) thereafter. The use of the blowing agent also produces a more repeatable and consistent structure than previously achievable, as the blowing agent is more uniformly activated through the product.

Another advantage with the process described herein is that parts that do not meet production standards can be ground-up and reused as inner material 40. Reuse of the inner material 40 is facilitated because endothermic blowing agents tend to fully activate during the processes described herein, and therefore are entirely "spent." As a result, this material can be reground and reliably reused as inner material.

Endothermic blowing agents also tend to remain homogenized when added to the inner material 40. Because the endothermic blowing agents absorb heat, the need for external cooling is reduced, thereby reducing cycle times by five to ten percent.

Without the use of a blowing agent, large voids and shrinkage would occur in areas of thick cross-section, which would adversely impact the aesthetics and functionality of the chair. As the plastic cools, the blowing agent expands, negating the plastic's tendency to shrink and form voids. This reduces or eliminates the sink marks and other poor aesthetics associated with thick cross sections and reduces undesirable stresses associated with the uneven distribution of material in the chair. This produces chairs and other parts which have consistent and repeatable sizes and profiles.

In order to provide additional flexibility to the manufacturing process, gas assist may be added to the injection molding process, as shown in FIG. 6. This allows for improved packing of the chair while minimizing the "post blow." Post blow is a condition in which the plastic part swells after being removed from the mold. This swelling occurs because the blowing agent is still reacting and the inner and outer materials are still hot enough to be pliable. Without the use of gas assist method and the pathways associated therewith, the blowing agent is completely encapsulated by the outer material 30 of the chair 50, such that the blowing agent has no place to escape or out gas.

Figure 7:
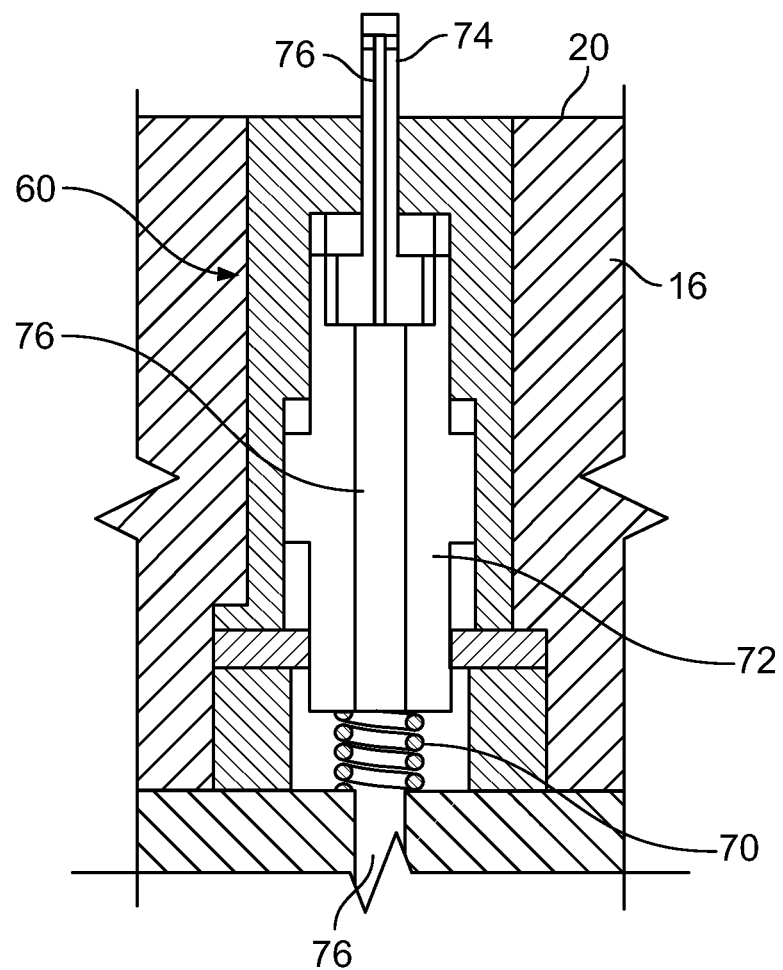
FIG. 7 is an enlarged cross section of one embodiment of the gas nozzle of the molding machine.

Therefore, in order to avoid the issue of post blow, the mold 16 and the process of manufacture of the chair 50 include a gas nozzle or pin 60 (as best shown in FIGS. 6 and 7) in the mold 16 to allow for gas assist. In order to facilitate the gas assist process, a pressurized gas mechanism 62 is provided which includes a source of pressurized gas 64 and a pressure regulator 66. The gas nozzle or pin 60 is used to inject the pressurized gas 64 into the mold 16. More specifically, the gas nozzle 60 may be located in the runner of the mold 16 or in the mold cavity 20. In addition, the gas nozzle 60 may be stationary with respect to the wall 24 of the mold cavity 20 or may be movable or retractable relative to the wall 24 of the mold cavity 20. If the gas nozzle 60 is movable relative to the wall 24 of the mold cavity 20, the gas nozzle 60 may incorporate a spring 70 (FIG. 7) or other known mechanism to provide it with the necessary spring force to allow the gas nozzle 60 to pierce the outer material 30 when the nozzle 60 is moved into position to inject the pressurized gas into the inner material 40.

The use of the gas assist allows pressurized gas, such as pressurized nitrogen, to be introduced at various points in the injection molding process or cycle. The introduction of the gas displaces molten inner material 40 to form hollow voids inside the inner material 40, thereby helping to pressurize the internal structure of the chair 50, particularly in the thick sections or sections with a large cross-section 52, as shown in FIG. 4. The introduction of the gas nozzle 60 into the molten inner material 40 also provides a pathway 76 (FIG. 7) which allows the gas generated by the expansion of the blowing agent to be vented through the gas nozzle or pin 60 outside of the outer material 30. In so doing, the effects of post blow are minimized, as the gas generated by the blowing agent is not trapped in the inner material 40, thereby minimizing the swelling of the chair 50. In addition, as the gas nozzle 60 is removed from the outer material 30, whether by retraction of the mold 16 or by retraction of the gas nozzle 60 independent of the mold 16, at least one hole or opening 80 (FIG. 4) remains in the outer material 30 to provide a pathway which allows the out gas generated by the blowing agent to continue to escape as the inner material 40 continues to cool.

The use of the gas assist also allows the molten inner material 40 to cure more quickly. As the gas generated by the blowing agent is allowed to vent to the outside through the outer material 30, the heat generated by the endothermic blowing agent is released to the outside, thereby allowing the inner material 40 to cool more quickly. In addition, as the temperature of the pressurized gas 64, i.e. nitrogen gas, injected into the molten inner material 40 is comparably low relative to the temperature of the molten inner material 40, some of the heat generated by the endothermic blowing agent is absorbed by the pressurized gas 64, thereby also allowing the inner material 40 to cool more quickly.

The use of the pressurized gas when co-injection molding large objects, such as a chair 50, provides several advantages over, and addresses many of the problems caused by, molding thick pieces of plastic using known methods. The process described herein allows for improved packing of the chair while minimizing the swelling that occurs because the blowing agent is still reacting and the inner and outer materials are still hot enough to be pliable. Without the use of gas assist, the blowing agent is completely encapsulated by the outer material 30 of the chair 50, such that the blowing agent has no place to escape or out gas. With the gas assist and the associated pathways, the inner material 40 is allowed to cool more quickly and the heat and pressure associated with the blowing agent is allowed to out gas, thereby insuring that the finished molded chair 50 or other item is aesthetically pleasing while providing increased strength and reduced weight compared to traditional plastic chairs formed with known methods.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of making a chair comprising:
co-injection molding a first portion of an outer material in a mold cavity;
co-injection molding an inner material in a mold cavity, the inner material including a blowing agent uniformly distributed therein, the inner material cooperating with the outer material;
co-injection molding a second portion of the outer material to encapsulate the inner material in a mold cavity;
injecting pressurized gas into the inner material in the mold cavity, the pressurized gas having a temperature which is comparably low relative to a temperature of the co-injection molded inner material including the blowing agent;
displacing the inner material including the blowing agent, to form a hollow channel inside the inner material;
providing a pathway which allows gas generated by the expansion of the blowing agent to be vented outside of the outer material;
removing the completed chair from the mold cavity;
maintaining the pathway as the chair is removed from the mold cavity;
wherein the introduction of the pressurized gas into the inner material displaces a portion of the inner material to help pressurize the internal material and provides additional cooling to the inner material;
wherein providing the pathway allows heat and pressure associated with the blowing agent to out gas as the chair is in the mold cavity and after the chair is removed from the mold cavity, thereby preventing the gas generated by the blowing agent from being trapped and minimizing the effects of post blow of the blowing agent.

2. The method of claim 1 wherein the inner material is stronger than the outer material.

3. The method of claim 1 wherein the outer material does not have a blowing agent.

4. The method of claim 1 wherein the blowing agent is an endothermic blowing agent.

5. The method of claim 4 wherein the blowing agent ranges from 0.1 to 1.00 volume percent of the inner material.

6. The method of claim 1 wherein the inner material ranges from 10 to 20% of the volume of the article.

7. The method of claim 6 wherein the first portion of the outer material ranges from 60 to 70% of the volume of the chair and the second portion of the outer material ranges from 10 to 30% of the volume of the chair.

8. The method of claim 1 wherein the pressurized gas is injected into the mold cavity by a pressurized gas mechanism which includes a source of pressurized gas and a pressure regulator.

9. The method of claim 1 wherein a gas nozzle injects the pressurized gas into the inner material.

10. The method of claim 9 wherein the gas nozzle is movable relative to a wall of the mold cavity.

11. The method of claim 10 wherein the gas nozzle has a spring to provide it with the necessary spring force to allow the gas nozzle to move relative to the wall of the mold cavity and to pierce an outer skin of the outer material when the nozzle is moved into position to inject the pressurized gas into the inner material.

12. The method of claim 10 wherein as the gas nozzle is retracted from the outer material, an opening is provided in the outer material, the opening providing a pathway which allows out gas generated by the blowing agent to escape as the inner material cools.

13. The method of claim 9 wherein the introduction of the gas nozzle into the inner material provides a pathway which allows out gas generated by the expanding of the blowing agent to be vented through the gas nozzle through the outer material, whereby the effects of post blow in the inner material are minimized and whereby the swelling of the chair is minimized.

14. A method of making a chair comprising:
co-injection molding a first portion of an outer material in a mold cavity;
co-injection molding an inner material in a mold cavity, the inner material having a blowing agent uniformly distributed therein, the inner material cooperating with the outer material;
co-injection molding a second portion of the outer material to encapsulate the inner material in a mold cavity;
displacing the inner material including the blowing agent, to form a hollow channel inside the inner material;
forming a pathway through the outer material and into the hollow channel of the inner material allowing gas generated by the expansion of the blowing agent to be vented outside of the outer material;
removing the completed chair from the mold cavity;

maintaining the pathway as the chair is removed from the mold cavity;

wherein forming the pathway allows out gas generated by the expanding of the blowing agent of the inner material to be vented through the outer material as the chair is in the mold cavity and after the chair is removed from the mold cavity, thereby preventing the out gas generated by the blowing agent from being trapped and minimizing the effects of post blow and swelling of the chair.

15. The method of claim 14 wherein the outer material is a synthetic thermoplastic resin.

16. The method of claim 14 wherein the outer material is a glass-filled polypropylene copolymer.

17. The method of claim 14 wherein the inner material is a synthetic thermoplastic resin.

18. The method of claim 14 wherein the inner material is a glass-filled polypropylene copolymer.

\* \* \* \* \*